United States Patent
Mathias et al.

(10) Patent No.: US 12,020,310 B2
(45) Date of Patent: Jun. 25, 2024

(54) SCAN AND GO SYSTEM AND METHOD

(71) Applicant: Merkle, Inc., Columbia, MD (US)

(72) Inventors: Richard Mathias, Godalming (GB); Valerie Vacante, Austin, TX (US); Benoit Soucaret, London (GB); Sanjeev Desai, Croydon (GB)

(73) Assignee: MERKLE INC., Columbia, MD (US)

( * ) Notice: Subject to any disclaimer, the term of this patent is extended or adjusted under 35 U.S.C. 154(b) by 185 days.

(21) Appl. No.: 17/452,613

(22) Filed: Oct. 28, 2021

(65) Prior Publication Data

US 2022/0129972 A1    Apr. 28, 2022

Related U.S. Application Data

(60) Provisional application No. 63/106,415, filed on Oct. 28, 2020.

(51) Int. Cl.
| | | |
|---|---|---|
| *G06Q 30/06* | (2023.01) | |
| *G06K 7/14* | (2006.01) | |
| *G06Q 20/20* | (2012.01) | |
| *G06Q 20/32* | (2012.01) | |
| *G06Q 30/0601* | (2023.01) | |

(52) U.S. Cl.
CPC ....... *G06Q 30/0641* (2013.01); *G06K 7/1413* (2013.01); *G06Q 20/208* (2013.01); *G06Q 20/3224* (2013.01)

(58) Field of Classification Search
CPC ............. G06Q 30/0641; G06Q 202/08; G06Q 202/3224; G06K 7/1413
USPC ...................................................... 705/27.1
See application file for complete search history.

(56) References Cited

U.S. PATENT DOCUMENTS

| | | | |
|---|---|---|---|
| 2013/0132193 A1* | 5/2013 | Aihara | G06Q 30/0235 705/14.51 |
| 2014/0090041 A1* | 3/2014 | Kim | G06F 21/31 726/7 |
| 2014/0188742 A1* | 7/2014 | Deselaers | G06Q 50/01 705/319 |
| 2018/0068264 A1 | 9/2018 | Stout et al. | |
| 2018/0309808 A1* | 10/2018 | Andon | G06T 19/20 |
| 2019/0034921 A1 | 1/2019 | Hammad et al. | |

(Continued)

FOREIGN PATENT DOCUMENTS

| | | | | |
|---|---|---|---|---|
| JP | 2002063463 A | * | 2/2002 | G06F 17/60 |
| WO | WO-2013191325 A1 | * | 12/2013 | G06F 21/31 |

OTHER PUBLICATIONS

Hyman, Jack Alan, "Towards an Understanding of Mobile Website Contextual Usability and its Impact on Mobile Commerce"; ProQuest Dissertations and Theses ProQuest Dissertations Publishing. (2012), retrieved from Dialog on Sep. 18, 2023 (Year: 212).*

(Continued)

*Primary Examiner* — Yogesh C Garg
(74) *Attorney, Agent, or Firm* — Finnegan, Henderson, Farabow, Garret & Dunner LLP

(57) ABSTRACT

A method and computer platform for an application-free web browser-based product purchase. The method and computer platform gain access to a camera of a mobile device through a web browser to use the mobile device as an image scanner, linking physical product shopping with online payment processing.

18 Claims, 9 Drawing Sheets

(56) References Cited

U.S. PATENT DOCUMENTS

2020/0020012 A1* 1/2020 Kaliamurthy ...... G06Q 30/0625

OTHER PUBLICATIONS

PCT Search Report for counterpart PCT Application No. PCT/US2021/072088, dated Jan. 28, 2022, 2 pages.
PCT Written Opinion for counterpart PCT Application No. PCT/US2021/072088, dated Jan. 28, 2022, 10 pages.

* cited by examiner

SCAN AND GO SYSTEM AND METHOD

CROSS-REFERENCE TO RELATED APPLICATIONS

This application is a non-provisional patent application of and claims priority to U.S. Provisional Patent Application No. 63/106,415, filed on Oct. 28, 2020, and entitled "LiveArea Scan and Go System and Method", the disclosure of which is hereby incorporated herein by reference as if reproduced in its entirety.

FIELD OF THE DISCLOSURE

The present disclosure generally relates to shopping and payment of products, and more particularly, to application-free web browser-based digital shopping and payment for in-store product purchases.

BACKGROUND

Retailers and their customers desire a simplified means for shopping and paying in retail environments that simplifies the whole shopping and payment process. Some retailers have employed application-based systems using iOS or Android platforms that allow customers to make purchases within the retail environment without having to checkout at a cash register (e.g., checkout-free experiences). These native application-based systems have been provided for iOS and Android devices; however, the application-based systems typically require customers to have a separate retailer-specific application downloaded to their personal communication devices in order to shop and/or make purchases using these application-based systems. Further, customers are somewhat tired of having to download specific applications, as the majority of U.S. consumers download zero applications per month. Additionally, artificial intelligence computer vision (AICV) also has been used which provides the ability for customers to grab desired items and walk out of the store, but this requires a significant investment in hardware, sensors, and cameras for these systems to be used in physical retail environments.

SUMMARY

The disclosed method, computer platform, and computer system provide a practical application by providing an application-free web browser-based in-store purchase technique that links purchasing items in a physical location to online shopping and payment using a retailer's ecommerce web site.

The method can include engaging a web browser running on a mobile device, wherein an ecommerce website is displayed on the web browser during the step of engaging; instructing the web browser to activate a camera module of the mobile device to capture a first image using a camera of the mobile device; and updating the ecommerce web site that is displayed on the web browser to include a product associated with the first image in an online shopping cart. The first image can be a barcode of the product.

The method can include processing payment for the product. Processing payment for the product can include engaging the web browser; instructing the web browser to activate the camera module to capture a second image using a camera of the mobile device; sending the second image, or causing the web browser to send the second image, to a payment module; and processing payment for the product via the payment module. The second image can be an image of a payment card.

The method can also include receiving confirmation of payment from the payment module; displaying a third image on the web browser via the ecommerce website; and receiving confirmation that the third image has been validated. The customer can then take that product from the store without waiting for an employee to prepare the order or waiting in a check-out line.

The computer platform can be configured to perform any embodiment of the method.

The computer system can include the computer platform, optionally a database, and optionally an image processor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
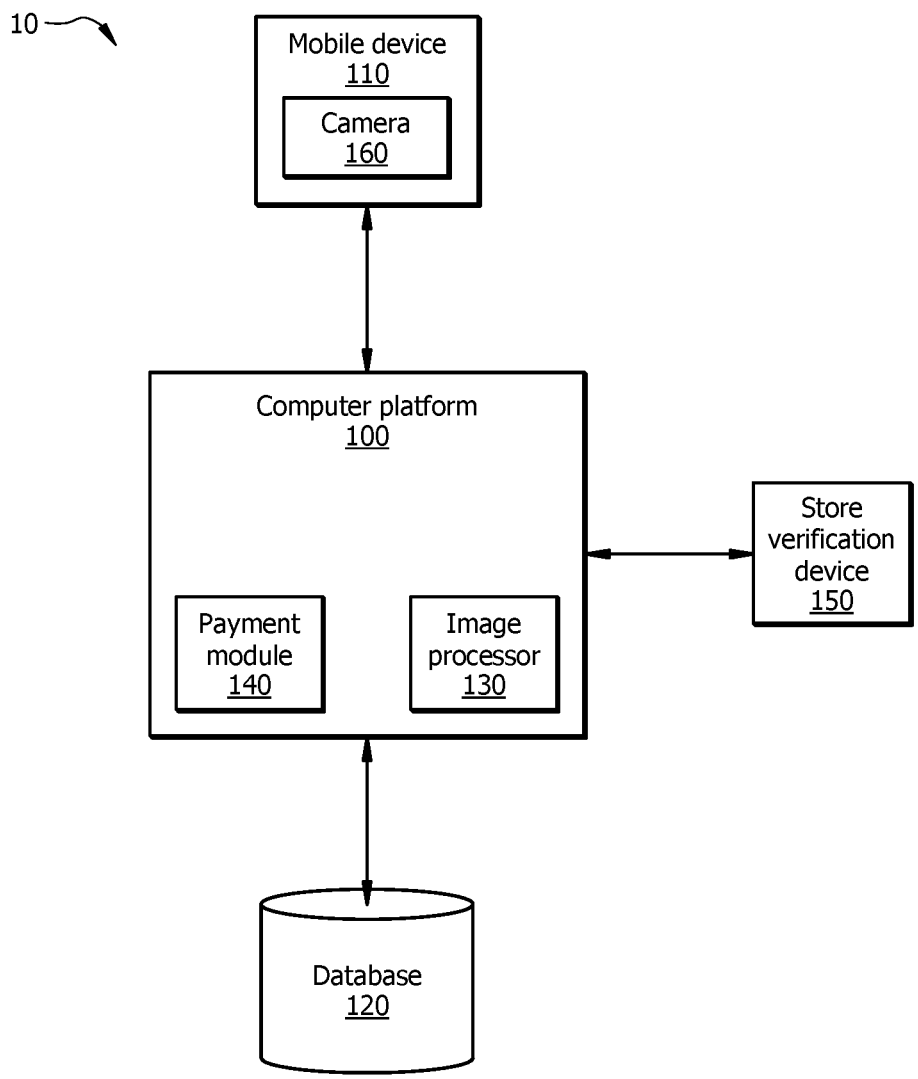
FIG. 1 illustrates a schematic diagram of the disclosed computer system.

The term "mobile device" as used herein refers to a mobile phone (e.g., smartphone), a tablet, a laptop, a smart watch, or other computer device configured to run a mobile web browser.

The terms "application program", "application", or "app" as used herein refer to instructions stored on and/or running on a mobile device, which when executed by a processor of the mobile device, cause the mobile device to perform specific functions.

Conventionally, customers can purchase products either online or in a physical store. There has not conventionally been a way for a customer to purchase a product or item located in a physical store by online shopping, while the customer is in the physical store. Some retailers have designed custom apps for rewards and other incentive programs while a customer is in the store; however, the customer must still purchase items and products from a cashier. Other retailers have tested or implemented digital shopping at physical stores; however, the digital shopping is limited to purchases made through a downloaded app. There has been a technical problem, with retailers not having a way to link the barcode on a physical product to online payment processing without using a custom app for the particular retailer.

The computer system, computer platform, and method described herein solve this problem by linking online shopping with the purchase of physical products and items in a physical store while the customer is in the physical store. Aspects of the computer system, computer platform, and method disclosed herein provide an application-free web browser-based product purchase that does not require a custom app, but rather uses a customer's mobile device as an extension of a computer platform. A customer using a mobile device can access a website for a retailer that is hosted by a computer platform via a web browser running on the mobile device. The customer can peruse products physically in the store, and if an item is found the customer is interested in, the customer can give permission for the computer platform to engage a web browser and instruct the web browser to activate a camera module of the mobile device to capture an image (e.g., the barcode of the product or item) using a camera of the mobile device. The camera is controlled temporarily as an additional component of the computer platform to capture the image. This control can be performed during product identification, during payment for the product, or both. The product can be added to an online shopping cart, and payment for the item can be processed as described herein.

A button on the check-out page of the web site that is selectable by the customer on the screen of the mobile device can, after being pressed, allow the customer to again give the computer platform permission to engage a camera module of the mobile device via the web browser and instruct the camera module, or cause the web browser to instruct the camera module, to capture another image (e.g., the payment card) using the camera of the mobile device. The camera is again controlled momentarily as an additional component of the computer platform capturing the image to capture payment information. The image processor can extract the payment card information from the image and send the payment card information to the computer platform. The computer platform can then use a payment module to process payment for the item(s) in the online shopping cart. Once confirmation of payment is received by the computer platform, the computer platform can send purchase information (e.g., identity and quantity of items purchased) to the database so for purchase history storage and inventory update. The computer platform can display another image (e.g., a bar code) on the website that is displayed on the mobile device via the web browser, and the image displayed on the mobile device scan be scanned by a verification device to verify that the items have been paid. The verification device can send verification of purchase to the computer platform, and the computer platform can store the verification of purchase in the database.

FIG. 1 illustrates a schematic diagram of the disclosed computer system 10. The computer system 10 can include a computer platform 100, at least one mobile device 110, a database 120, an image processor 130, and a store verification device 140. The components of the system 10 are linked or networked with at least one other component as shown in FIG. 1: the at least one mobile device 110 is networked with the computer platform 100, the database 120 is networked with the computer platform 100, and the store verification device 140 is networked with the computer platform 100. Each of the components 100, 110, 120, 130, and 140 shown in FIG. 1 can be embodied with computer equipment such as one or more processors, memory, networking cards or interfaces, and other equipment for processing data. In some embodiments, the image processor 130 can be embodied as a software module running on the computer platform 100; alternatively, in other embodiments, the image processor 130 can be embodied as a third-party computer having software running thereon that performs the functions for the image processor 130 disclosed herein.

Regarding network communication technology, the computer platform 100 can be networked with the other components of the computer system 10 via any wired internet connection, wireless connection, local area network (LAN), wired intranet connection, wireless intranet connection, or combinations thereof.

The computer platform 100 can include one or more processors, memory, networking cards or interfaces, and other equipment for performing the method disclosed herein for a check-out free shopping system that does not require an additional application. The computer platform 100 can include multiple computers, located in a brick-and-mortar location, local to the administrator of the computer platform 100, in the cloud, or a combination thereof. The computer platform 100 can be configured to communicate simultaneously with multiple mobile devices 110, the database 120, the image processor 130, and the store verification device 140. The functionality of the computer platform 100 is described in more detail below in the disclosed method.

The computer platform 100 can further include a payment module 150. The payment module 150 can receive the customer's payment information from the computer platform 100, transmit this information to one or more financial institutions or credit card companies, and receive confirmation of payment from the financial institutions or credit card companies. In certain embodiments the payment module 150 can be a part of the computer platform 100, while in other embodiments the payment module 150 can be a separate module that can have one or more processors, memory, and networking cards or interfaces. The payment module 150 can have secure network access to send the payment information to the corresponding financial institution or credit card company. The payment module 150 can also be configured to send and receive messages with the computer platform 100. The payment module 150 can have several encryption and security measures installed to prevent breaches and inadvertent disclosure of the customer's financial details.

The mobile device 110 can be embodied as a smartphone; however, the mobile device 110 can be embodied as another device within the scope of mobile devices as described herein. The mobile device 110 is configured to have access to the internet and more specifically a web browser with access to retailers' websites. In an embodiment, the retailers' web sites do not require the customer to download a separate application to proceed with shopping. The mobile device 110 also includes a camera 160 that is controlled by the computer platform 100 according to the techniques disclosed herein. The camera 160 can be operated by a camera module (e.g., camera module 320 in FIG. 3) stored on the mobile device 110 and executable for using the camera 160.

The database 120 can include one or more processors, memory, networking cards or interfaces, and other equipment such that the database 120 can store product information. In embodiments, the database 120 can be considered to be a part of the computer platform 100; while in other embodiments, the database 120 is separate from the computer platform 100. In some embodiments, the database 120 can be embodied as a server (e.g., one or more processors, memory, networking cards or interfaces, and other equipment) such that the computer platform 100 is a client to the server 120. The database 120 can store information on the retailer's products, such as product identifiers, inventory amount of a product, price of a product, etc., and send and receive communications to and from the computer platform 100. For example, the computer platform 100 can send request messages requesting either storage of data by the server 120 (e.g., updating the inventory numbers) or receipt of certain data from the server 120, and the server can send a response message containing the requested data. In other embodiments, the database 120 can be embodied as a database (e.g., memory storage media) configured to store data that is written to the memory by a processor(s) of the computer platform 100 and that is accessible by the computer platform 100 for retrieving the retailer's data from the database 120.

The image processor 130 can be configured to receive one or more images from the mobile device 110 and to analyze the images. In certain embodiments the image processor 130 can be a part of the computer platform 100; while in others the image processor 130 may be embodied as a software module contained on a third-party computer that is separate from the computer platform 100. The image processor 130 is configured to recognize the image as a barcode, Universal Product Code (UPC) International Article Number (IAN), European Article Number (EAN), or a payment card or other image containing payment information. In embodiments where the image is a barcode, UPC, IAN, or EAN, the image processor 130 can then send a product identifier associated with the scanned image to the computer platform 100. The computer platform 100 can then request all the information for the associated product from the database 120. In embodiments where the image is a payment card or other image containing payment information, the image processor 130 is configured to extract payment information (e.g., the card number, name, expiration date, security code, or combinations thereof) from the image, and send the information to the computer platform 100. The computer platform 100 can then populate the website displayed on the mobile device with the payment information.

The store verification device 140 can include one or more processors, memory, networking cards or interfaces, and other equipment for verifying that an order was paid for before the customer leaves the store with the products. The store verification device 140 can be a handheld device or included in a kiosk. In embodiments where the store verification device 140 is a handheld device, an employee can hold the store verification device 140 near the exit to the store to scan a digital receipt produced by the customer. Once the receipt is scanned, the store verification device 140 can show the employee the items that were purchased. In embodiments where the store verification device 140 is a kiosk, the customer can scan the mobile receipt at the kiosk. The kiosk can also include one or more devices to deactivate or remove anti-theft devices attached to the products. The kiosk can block access to these removal devices until a receipt is scanned.

The store verification device 140 can be a computer or mobile device. The store verification device 140 can include one or more processors, memory, and networking cards or interfaces. The store verification device 140 can be an automated kiosk or can be a device used by a store employee. The store verification device 140 can have a camera or scanner configured to read a digital receipt provided by customers to verify that the products were paid for. The store verification device 140 can send a request message to the computer platform 100 to request the order associated with the scanned receipt.

Figure 2:
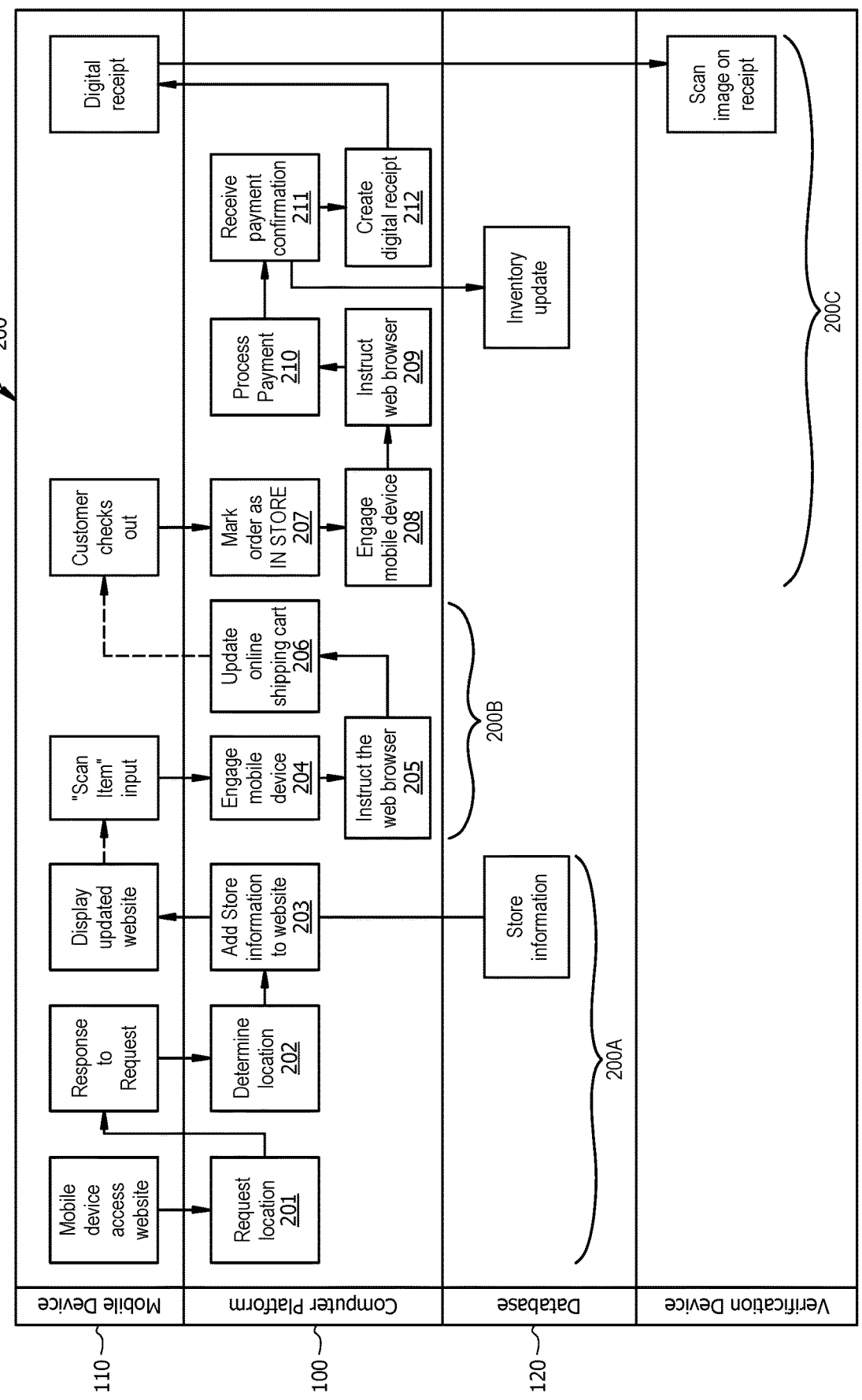
FIG. 2 illustrates a flowchart of a method for an application free shopping experience according to the disclosure.

FIG. 2 illustrates a flowchart of a method 200 for an application free shopping experience according to the disclosure. Embodiments of the method 200 disclosed herein shall be described with reference to the components illustrated in FIG. 1, where applicable. The method steps are generally performed by the computer platform 100 in FIG. 1 unless otherwise stated. The method steps can be performed in orders different than those shown in FIG. 2.

The method 200 generally includes three sections: an optional first section 200A in which the computer platform 100 determined the location of a mobile device 110 adds store information to the retailer's website based on the determined location of the mobile device 110; a second section 200B in which the computer platform 100 engages the web browser of the mobile device 110 in order to briefly take control of the mobile device 110 to scan the barcode of a product to be purchased; and an optional third section 200C in which the computer platform 100 processes payment for any product(s).

The optional first section 200A of the method 200 includes steps 201, 202, and 203 that are performed by the computer platform 100. FIG. 2 illustrates the interaction of the computer platform 100 with the mobile device 110 and database 120 in order to accomplish performance of steps 201, 202, and 203.

At step 201, the method 200 includes sending a location request to the mobile device 110, where the location request contains a query for the location of the mobile device 110. The location request is sent to the mobile device 110 in response to the mobile device 110 accessing an ecommerce website administered by the computer platform 100. The computer platform 100 can display the website on the mobile device 110 via the web browser of the mobile device 110. The customer can access the ecommerce website by, for example, scanning a QR code, entering in the website URL into a web browser, selecting a link via email or search engine or text message, or combinations thereof. The location data of the mobile device 110 can be gathered by the mobile device 110 via a Global Positioning Device (GPS) module running on the mobile device 110 or via a Wi-fi or data signal that the mobile device 110 is using to access the website. Certain embodiments of the location request in step 201 may include displaying a list that contains potential physical store locations on the website via the web browser, and the store location can be selected by the customer on the mobile device 110 and sent by the mobile device 110 to the computer platform 100 via the website and web browser. In these embodiments, the list can be generated by the computer platform 100 based on information communicated from the mobile device 110 to the computer platform 100 such as information about the address of the Wi-Fi network to which the mobile device 110 is connected at a physical store location. The address can be associated by the computer platform 100 with a physical store location based on historical store and Wi-Fi network information.

At step 202, the method 200 includes determining the location of the mobile device 110. In embodiments, the location can be determined by comparing the location received from the mobile device 110 to a list of physical locations where the retailer operates. The computer platform 100 can compare the location received from the mobile device 110 with physical locations of the retailer, and determine the physical location of a brick-and-mortar store run by the retailer based on the comparison.

Step 203 can also include adding store information associated with the determined physical location to the website that is displayed on the mobile device 110 via the web browser running on the mobile device 110. The ecommerce website displayed on the web browser is updated to display the store information specific to the determined location of the physical store. In embodiments, the store information associated with the determined physical location is received or retrieved from the database 120. The store information can include inventory, price of each item or product, offers, coupons, incentives, and other information that is relevant to a customer visiting the physical location of the retailer's store. Once the specific store information is applied to the instance of the website displayed on the web browser, the customer may consume the information on the website on the mobile device 110 while in the physical store.

In embodiments, the computer platform 100 can determine the location of the physical store is a part of the application-free checkout program. The physical store locations that are a part of the application-free checkout program can be saved in the database 120, and the computer platform 100 can compare locations having the application-free checkout program with the determined location of the mobile device 110 to determine whether the location has the application-free checkout program. In embodiments where the store is not a part of the application-free checkout program, the computer platform 100 can display a message on the website, notifying the customer of other physical store locations that are a part of the application-free checkout program.

The second section 200B of the method 200 includes steps 204, 205, and 206 that are performed by the computer platform 100. FIG. 2 illustrates the interaction of the computer platform 100 with the mobile device 110 and database 120 in order to accomplish performance of steps 204, 205, and 206.

At step 204, the method 200 includes engaging the web browser of the mobile device 110. Moreover, particularly, the computer platform 100 can engage a script of web browser (e.g., JavaScript C#, Python, HTML, CSS, SQL, or another coding language) of the mobile device 110. Prior to this step 204, the computer platform 100 displayed the ecommerce website on the web browser running on the mobile device 110. For embodiments of the method 200 that include method steps 201-203, the ecommerce website displayed on the mobile device 110 is specific to the location at which the computer platform 100 determined. For embodiments of the method 200 in which location is not determined in steps 201-203, the computer platform 100 can be configured to display the website on the web browser in a format that is not location specific.

In embodiments, engaging the web browser of the mobile device 110 can include interacting with a script and using the script to temporarily take over at least a portion of the processing bandwidth of the mobile device 110 in order to obtain a first image (e.g., a barcode of a product) via a camera module of the mobile device 110.

In embodiments, prior to engaging the web browser, the computer platform 100 can receive permission to engage the web browser by customer input at the mobile device 110. For example, the website can include a "Scan Item" button, and the customer can tap the "Scan Item" button, the input can be received by the computer platform 100 as an indication that the customer has given the computer platform 100 permission to engage the script on the web browser running on the mobile device 110 for the limited purpose of scanning the product or item (e.g., scanning the barcode).

At step 205, the method 200 includes instructing the web browser to activate a camera module of the mobile device 110 to capture a first image using a camera 160 of the mobile device 110. The computer platform 100 can interact with the script of the web browser such that the script is instructed to activate the camera module of the mobile device 110. Once the mobile device's 110 camera module is activated, the camera module can cause the camera 160 to take a photo (e.g., the first image) of a product, and in particular of the barcode of the product.

Via steps 204 and 205, the computer platform 100, in tandem with the temporary control of the camera of the mobile device 110 via the use of script on the web browser of the mobile device 110, can function as an image scanner (e.g., a barcode scanner). When the camera module is activated, the camera module and camera 160 of the mobile device 110 act as an extension of the computer platform 100 because the computer platform 100 has fractional and temporary control over the mobile device 110. These steps enable the application-free web browser-based product purchase because engaging the mobile device 110 to obtain the image links the physical store products with online shopping capabilities on the ecommerce website.

In embodiments, the computer platform 100 can be configured to disengage, or cause the web browser to disengage, from the camera module of the mobile device 110 after the first image is obtained.

In embodiments, the method 200 can optionally include the computer platform 100 sending the first image, or causing the web browser (e.g., the script of the web browser) to send the first image, to an image processor. The image processor can be a module contained within the computer platform 100 (e.g., image processor 130 illustrated in FIG. 1), such as a plugin in the software of the computer platform 100 that is able to read and identify the barcodes for the products. Alternatively, the image processor can be a third-party software module contained on computer equipment that is networked to the computer platform 100 and functions as an image processing service. Examples of commercially available third-party software modules are SCANDIT or ZEBRA. If there is a problem with the image received, such as blurriness, angle, or incomplete barcode, the image processor can return an error message to the computer platform 100, and the computer platform 100 can notify the customer via the ecommerce website on the web browser.

The image processor is configured to determine a product identifier associated with the image (e.g., a product identifier associated with the barcode). The product identifier can be an identifier for the product, including the name, a photo of the product, or other information that identifies the product associated with the image. In these embodiments, the method 200 can also include the computer platform 100 receiving the product identifier from the image processor.

At step 206, the method 200 includes updating the ecommerce website that is displayed on the web browser to include the product associated with the first image (and the product identifier) in an online shopping cart that is on the ecommerce website. The online shopping cart can contain the product name, price, and other relevant data associated with the image taken by the camera 160.

As the customer continues to shop, steps 204 to 206 can be repeated any number of times for any number of products present in the physical store.

The optional third section 200C of the method 200 includes steps 207 to 212 that are performed by the computer platform 100. FIG. 2 illustrates the interaction of the computer platform 100 with the mobile device 110 and database 120 in order to accomplish performance of steps 207 to 212.

At step 207, the method 200 includes marking an order comprising the products or items in the online shopping cart as "IN STORE". The "order" is the list of products or items in the online shopping cart. Prior marking the order as "IN STORE", embodiments contemplated that the computer platform 100 received an input from the mobile device 110 that the customer was ready to checkout with the products or items in the online shopping cart that is on the ecommerce website on the web browser of the mobile device 110. In response, the computer platform 100 can generate a checkout web page for the website that includes the products in the online shopping cart, any discounts or credits or loyalty adjustments, and the total cost of the order. In embodiments, the website can also include a section for the customer to input a payment method. The payment section can also include a button to activate the mobile device's 110 camera to gather payment information. Once the computer platform 100 has generated this instance of the website, the computer platform 100 can send the instance to the mobile device 110. Alternatively, payment information can be gathered according to steps 208 to 210.

At step 208, the method 200 includes engaging the web browser of the mobile device 110. Moreover, particularly, the computer platform 100 can engage the script of web browser (e.g., JavaScript, C#, Python, HTML, CSS, SQL, or another coding language) of the mobile device 110. In embodiments, engaging the web browser of the mobile device 110 can include interacting with a script and using the script to temporarily take over at least a portion of the processing bandwidth of the mobile device 110 in order to obtain a first image (e.g., a barcode of a product) via a camera module of the mobile device 110. In embodiments, prior to engaging the web browser, the computer platform 100 can receive permission to engage the web browser by customer input at the mobile device 110. For example, the website can include a "Scan Payment Card" button, and the customer can tap the "Scan Payment Card" button, the input can be received by the computer platform 100 as an indication that the customer has given the computer platform 100 permission to engage the script on the web browser running on the mobile device 110 for the limited purpose of scanning the customer's payment card.

At step 209, the method 200 includes instructing the web browser to activate a camera module of the mobile device 110 to capture a second image using a camera 160 of the mobile device 110. The computer platform 100 can interact with the script of the web browser such that the script is instructed to activate the camera module of the mobile device 110. Once the mobile device's 110 camera module is activated, the camera module can cause the camera 160 to take a photo (e.g., the second image) of the payment card, and in particular of the customer's payment information associated with the payment card.

Via steps 208 and 209, the computer platform 100, in tandem with the temporary control of the camera of the mobile device 110 via the use of script on the web browser of the mobile device 110, can function as an image scanner (e.g., a payment card scanner). When the camera module is activated, the camera module and camera 160 of the mobile device 110 act as an extension of the computer platform 100 because the computer platform 100 has fractional and temporary control over the mobile device 110. These steps enable the application-free web browser-based product purchase because engaging the mobile device 110 to obtain the payment card image links the purchase of the physical store products with online shopping purchasing capabilities on the ecommerce website.

In embodiments, the computer platform 100 can be configured to disengage, or cause the web browser to disengage, from the camera module of the mobile device 110 after the second image is obtained.

In embodiments, the method 200 can optionally include the computer platform 100 sending the second image, or causing the web browser (e.g., the script of the web browser) to send the second image, to the image processor discussed above, or to a different image processor.

The image processor can be a module contained within the computer platform 100 (e.g., image processor 130 illustrated in FIG. 1), that is able to read and identify the payment information. Alternatively, the image processor can be a third-party software module contained on computer equipment that is networked to the computer platform 100 and functions as an image processing service for payment processing. The image processor can analyze the image of the payment card and extract the payment information needed for the checkout process. The image processor can be configured to recognize at least card number, card holder name, and expiration date. In certain embodiments, the image processor can also be configured to recognize the security code on either the front or back of the card. The image processor can be configured to send an error message if the needed information is not recognizable in the image captured by the mobile device 110.

Once the image processor has recognized the payment information, the image processor can send the payment information to the computer platform 100. The computer platform 100 can update the ecommerce check-out web page with the payment information obtained by the image processor.

At step 210, the method 200 includes processing payment for the products or items in the online shopping cart using the payment information obtained from the image processor. Processing payment can include sending, by the payment module 150, the payment information to a financial institution. The payment module 150 can send the payment information for the order in a payment request to the financial institution that corresponds to the payment information. The payment module 150 can be configured to recognize the associated bank, financial institution, or credit card company that the payment card is associated with. The payment request sent by the payment module 150 can include a request for the required funds for the order. The payment module 150 can be configured to follow all applicable security and financial laws that relate to the transmission and storing of financial information.

At step 211, the method 200 includes receiving payment confirmation from the financial institution. The computer platform 100 can have two stored messages to inform the customer if payment was accepted or rejected. If the computer platform 100 receives a message of payment confirmation from the financial institution, the computer platform 100 can mark the order as complete. If the computer platform 100 receives a message of rejection from the financial institution, then the order can be marked as still pending.

In embodiments, after payment confirmation is received by the computer platform 100, the method 200 can include sending an inventory update message to the database 120. In order to help the retailer track inventory across different stores, the computer platform 100 can send a message to the database 120 when an order is completed. The inventory update message can include at least the products purchased, the number of each product purchased, and the store location where the items were purchased. The database 120 can update the inventory known for each product based on this message allowing the retailer to keep up to date inventory on the business's website. The inventory update messages can also be compiled by the database 120 or computer platform 100 so the retailer can understand the trends and what is selling better at different locations.

At step 212, the method 200 includes creating a digital receipt for the order. Once confirmation of the payment has been received by the computer platform 100, the computer platform 100 can produce a digital receipt as proof of purchase. The digital receipt can contain at least the order number of the completed order and a third image (e.g., a barcode) for the payment confirmation. The third image can be unique to the order and indicate that the order has been paid in full. The computer platform 100 can be configured to send the digital receipt to the mobile device 110 via the website (a confirmation webpage), an email, a text (SMS) message, or combinations thereof.

In embodiments, the customer can present the digital receipt displayed on the mobile device 110 to a verification device 140, that is configured to scan the third image (e.g., the barcode) of proof of purchase on the digital receipt. Once a customer has checked out through the web site and is ready to leave the store, the digital receipt the customer received can be scanned by the store verification device 140. When the store verification device 140 has scanned the receipt, the store verification device 140 can send a message to the computer platform 100. The computer platform 100 can keep track of all the orders that were scanned by the store verification device 140 or not. These verification numbers can be used in inventory tracking and training with employees.

Figure 3:
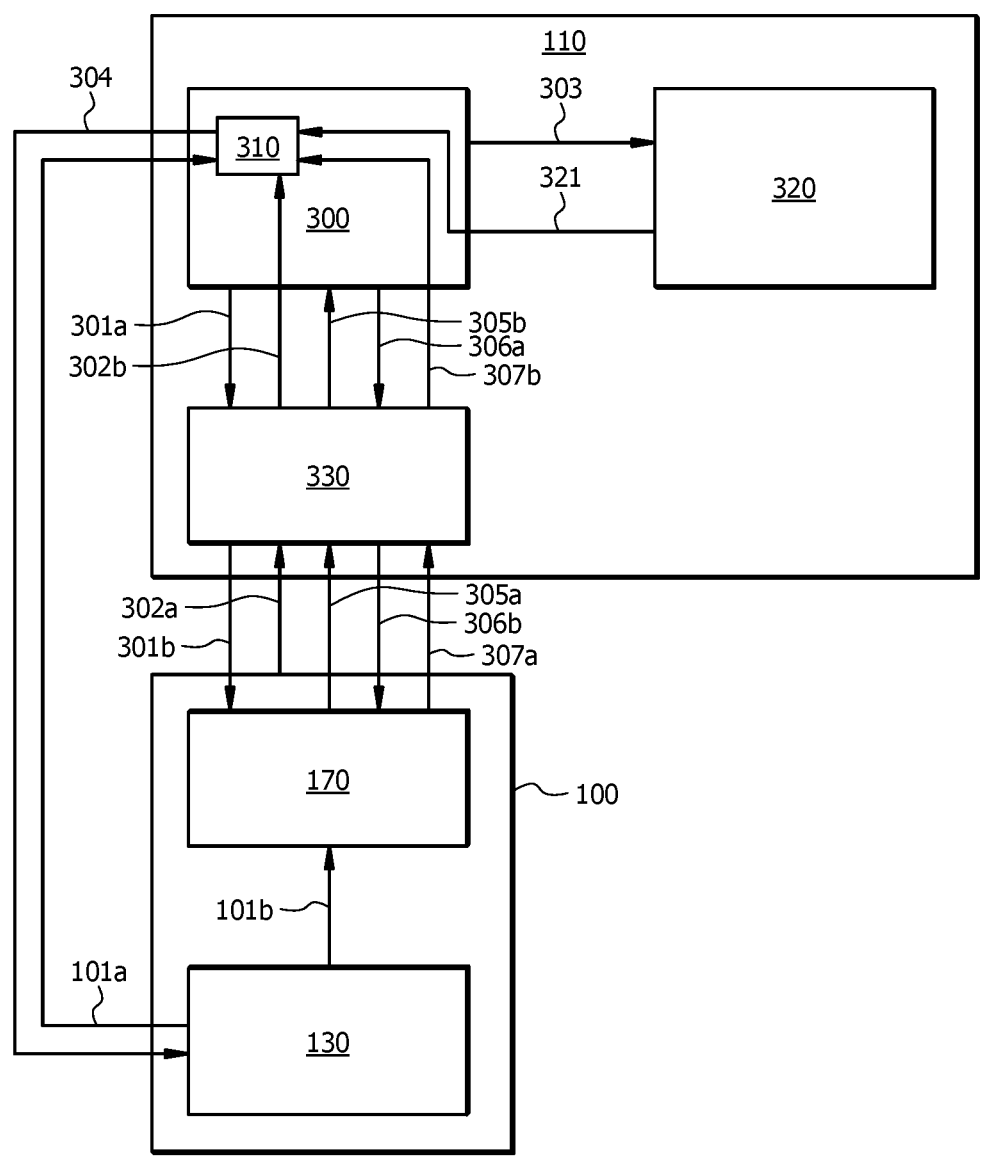
FIG. 3 illustrates a schematic diagram of the mobile device and computer platform, and interactions of the software executed in the respective devices.

FIG. 3 illustrates a schematic diagram of the mobile device 110 and computer platform 100, and interactions of the software executed in the respective devices.

The mobile device 110 has a web browser 300 running thereon, and the web browser 300 contain script 310, among other scripts and subroutines, plugins, etc. The mobile device 110 also has a camera module 320 contained thereon. The camera module 320 may or may not be running continuously. For example, the camera module 320 may be closed and not running until the script 310 on the web browser 300 engages the camera module 320. The web browser 300 can also contain a translation layer 330 to translate between the ecommerce website and the script 310 of the web browser 300.

The computer platform 100 can include the ecommerce website 170 and the image processor 130. In an alternative embodiment, the image processor 130 is not part of the computer platform 100, and alternative communications are described with respect to this alternative embodiment in arrows 101b, 305a, and 305b.

The web browser 300 can access a website 170, and the web browser 300 can be running a script 310, where the translation layer 330 is configured to allow communication between the computer platform 100 and the mobile device 110.

When a message needs to be sent from the mobile device 110 to the computer platform 100, or vice versa, the message goes through the translation layer 330 to get to the destination. The script 310 can be utilized to instruct camera module 320 on the mobile device 110 to activate the camera 160 (in FIG. 1), Arrows 301a and 301b represent a permission from the mobile device 110 to the computer platform 100 for the computer platform 100 to engage the script 310 in order to capture the first image described herein.

Arrows 302a and 302b represent the engagement message sent by the computer platform 100 to the script 310 of the web browser 300, where the engagement message engages the script 310 to activate the camera module 320.

Arrow 303 is the activation instruction from the script 310 to the camera module 320, and arrow 321 is the image taken by the camera 160 that is sent from the camera module 320 to the script 310 running on the web browser 300.

Next, arrow 304 is the image that is sent by the script 310 to the image processor 130. In embodiments where the image processor 130 is part of the computer platform 100, the script 310 sends the image to the image processor 130 on the computer platform 100. In those embodiments, the image processor 130 of the computer platform 100 can send the product associated with the image to the web browser 300. In alternative embodiments, the image processor 130 send the product association with the image to the computer platform 100, e.g., to the website 170 via arrow 101b. The website 170 is then updated by the computer platform 100 by adding the product to the online shopping cart which is displayed via arrows 305a and 305b to the web browser 300.

Arrows 306a and 306b indicate that when ready for check-out, the customer can again give permission to the computer platform 100 to engage the script 310 to obtain a second image, e.g., an image of a payment card. The script 310 again sends an activation message via arrow 303 to the camera module 320, and the camera module 320 sends a second image via arrow 321 to the script 310.

Arrow 304 indicates that the script 310 can send the second image to the image processor 130. The image processor 130 can extract payment information from the second image, and the computer platform 100 can process payment according to the above description.

FIGS. 4A to 4K illustrate a series of screenshots that are displayed on the ecommerce website administered by the computer platform disclosed herein.

Figure 4A:
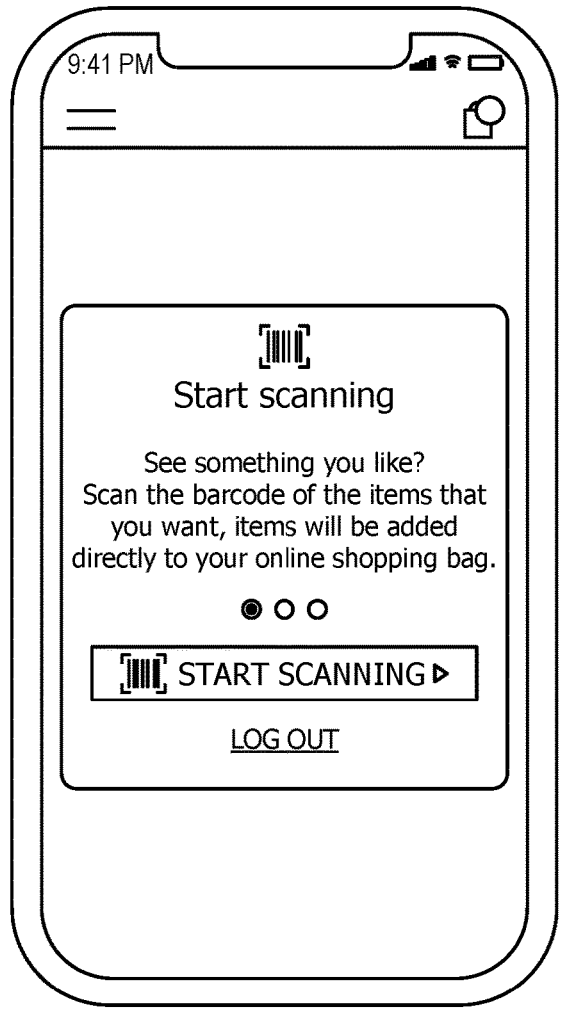
FIGS. 4A to 4K illustrate a series of screenshots that are displayed on the ecommerce website administered by the computer platform disclosed herein.

FIG. 4A depicts a screenshot of the main page of a retailer's website where a customer may start using the application-free web browser-based digital shopping and payment method and system for in-store purchases. As noted in FIG. 4A, the customer may be prompted to start scanning items that he/she may be interested in purchasing by scanning the barcode of the items. The items then may be added directly to the customer's online shopping cart. The main page may allow the customer to log into his/her account associated with the retailer if the customer already has an account on file with the retailer. However, it should be appreciated that the customer need not have an account already on file to begin using the application-free web browser-based digital shopping and payment method and system for in-store purchases in embodiments of the present disclosure. When the customer is ready to begin the shopping process, the customer may select the "start scanning" button on the main page as depicted in FIG. 4A. While the button is depicted as "start scanning," it should be appreciated that wording or input mechanisms (other than a button) may be used without departing from the present disclosure.

Figure 4B:
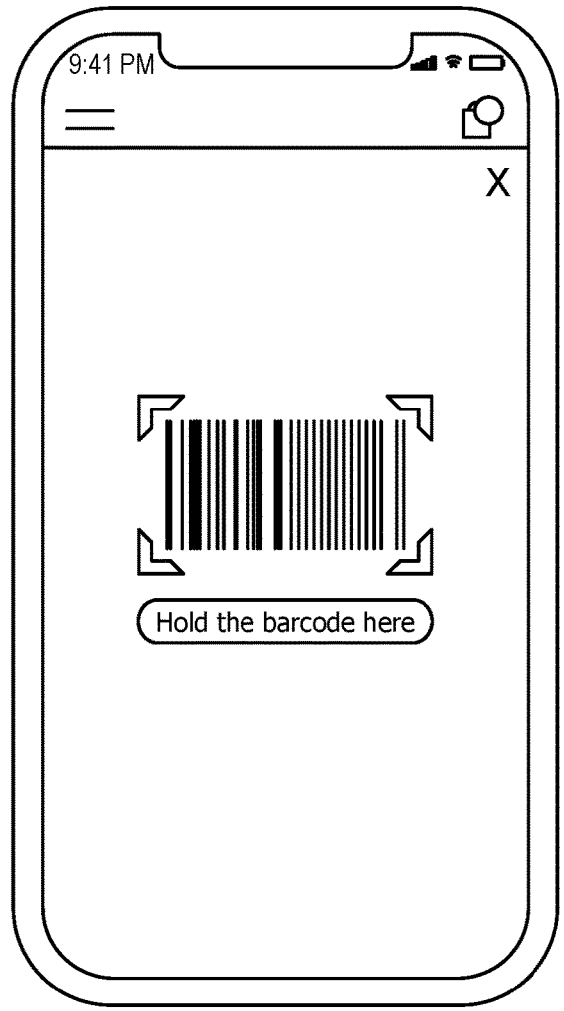

FIG. 4B depicts a screenshot of what the customer may be directed to when he/she elects to start scanning on FIG. 4A. The customer may be prompted for how to hold the barcode relative to his/her personal communication device, such as by showing a barcode as depicted in FIG. 4B.

Figure 4C:
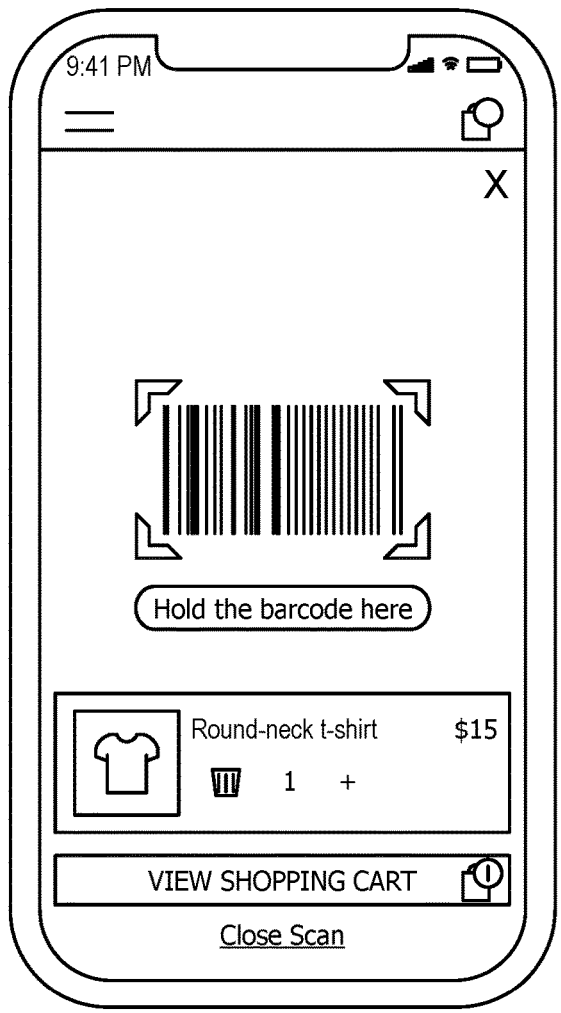

FIG. 4C further depicts a screenshot of the customer's online shopping cart using the application-free web browser-based digital shopping and payment method and system for in-store purchases in embodiments of the present disclosure. FIG. 4A depicts how items that have been scanned may be shown below the barcode so that the customer may confirm the items that he/she has selected and the price of those items. The customer also may adjust to add or subtract items to the shopping cart. The customer may be provided with a written description and/or image of the selected items in embodiments of the present disclosure.

Figure 4D:
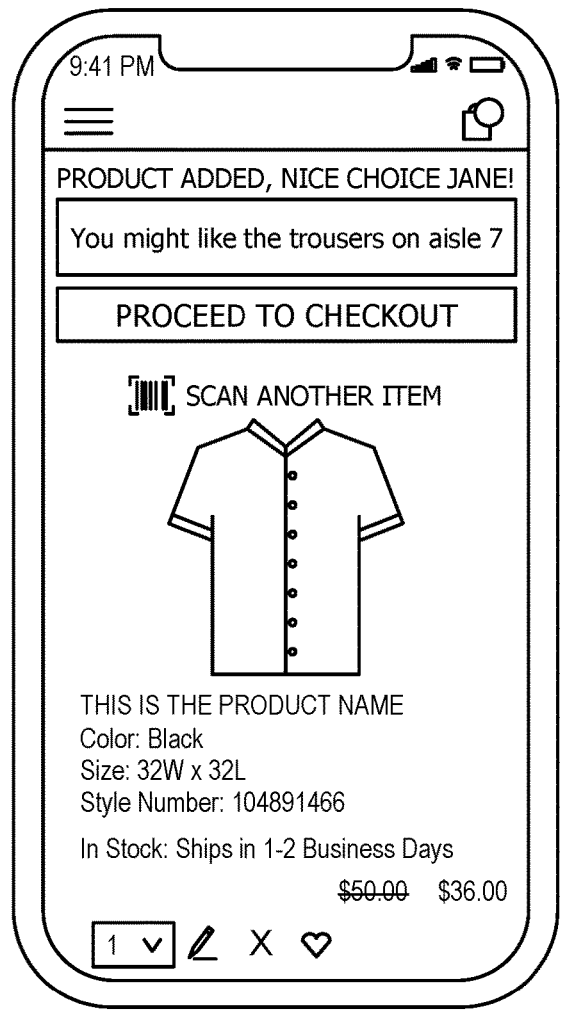

FIG. 4D depicts a screenshot of a product selection screen in the application-free web browser-based digital shopping and payment method and system for in-store purchases in embodiments of the present disclosure providing associated recommendations based on the consumer's selected item. The application-free web browser-based digital shopping and payment method and system for in-store purchases may be customized with product associations and promotional items in embodiments of the present disclosure. If the customer is satisfied with the items selected and the associated cost, he/she may be prompted to confirm that he/she is ready to checkout. However, if the customer wishes to add more items to his/her online shopping cart, this screen of the application-free web browser-based digital shopping and payment method and system for in-store purchases may allow the customer to do so.

Figure 4E:
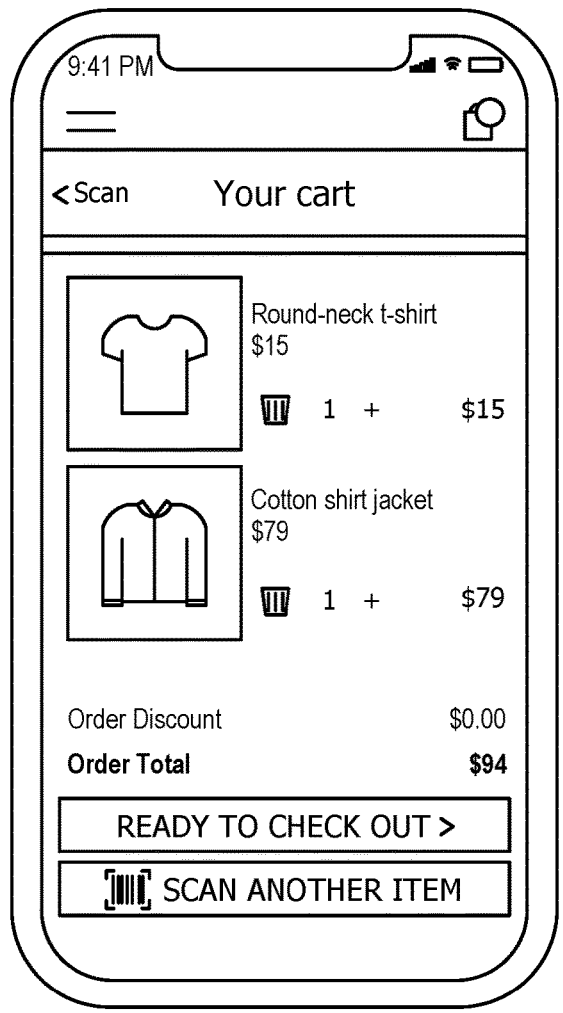

FIG. 4E depicts a screenshot of multiple items being selected for purchase in a customer's online shopping cart screen in the application-free web browser-based digital shopping and payment method and system for in-store purchases according to the embodiments of the present disclosure. As depicted herein, the customer may be provided with a summary of the items that have been added to the online shopping cart as well as the total cost for his/her order.

Figure 4F:
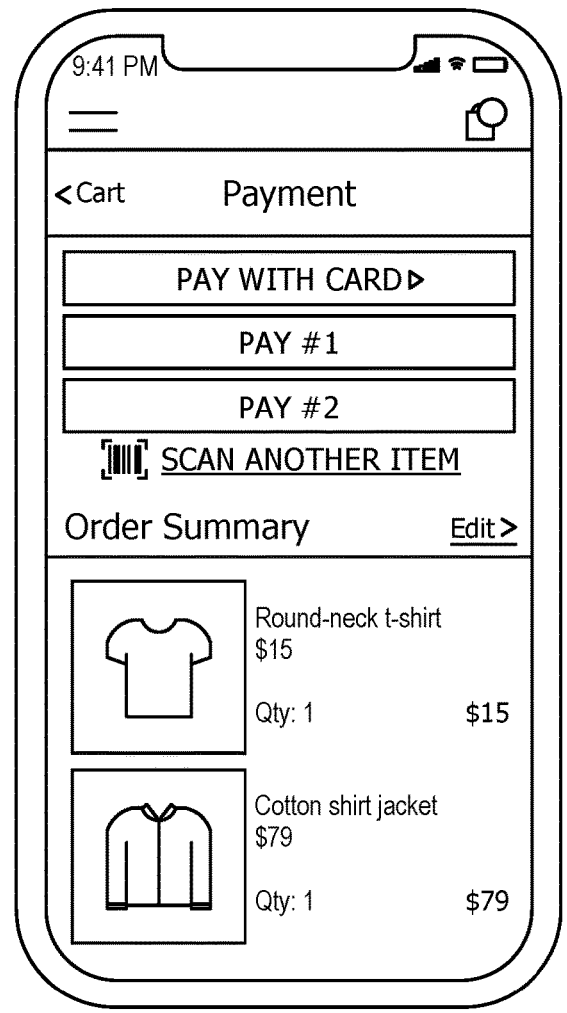

FIG. 4F depicts a screenshot of a payment selection screen in the application-free web browser-based digital shopping and payment method and system for in-store purchases according to an embodiment of the present disclosure. As depicted herein, the customer may elect to pay with a credit or debit card. The customer may also be presented with options to pay using e-payment providers (e.g., AMAZON PAY, APPLE PAY, or other online payment provider). The customer may also be provided with an order summary on this payment screen in some embodiments of the present disclosure and/or the customer may elect to scan additional items.

Figure 4G:
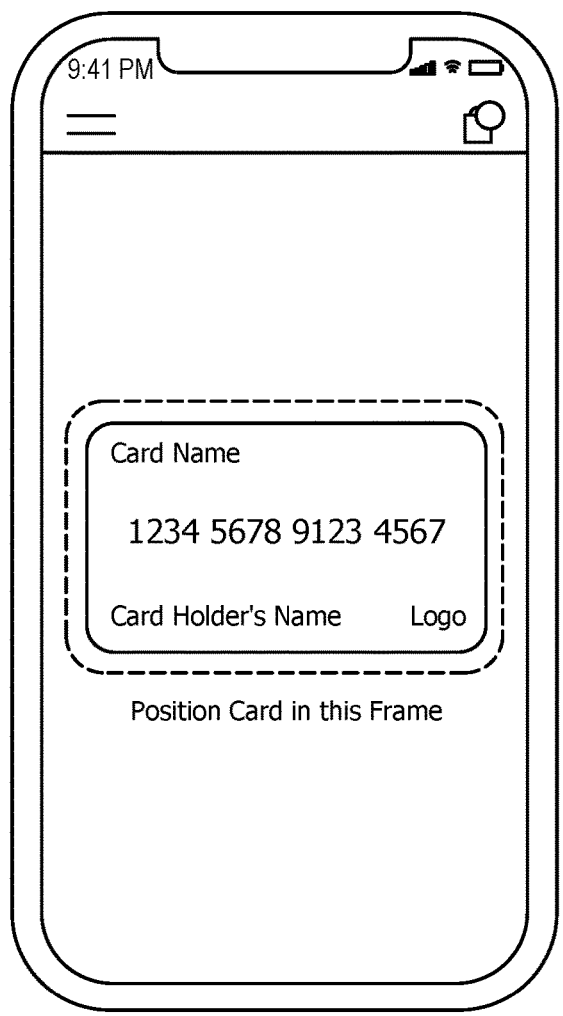

FIG. 4G depicts a screenshot should the customer elect to pay via credit or debit card. In embodiments of the present disclosure, the customer may be prompted to position his/her card in a frame, so that an image of the credit or debit card may be captured.

Figure 4H:
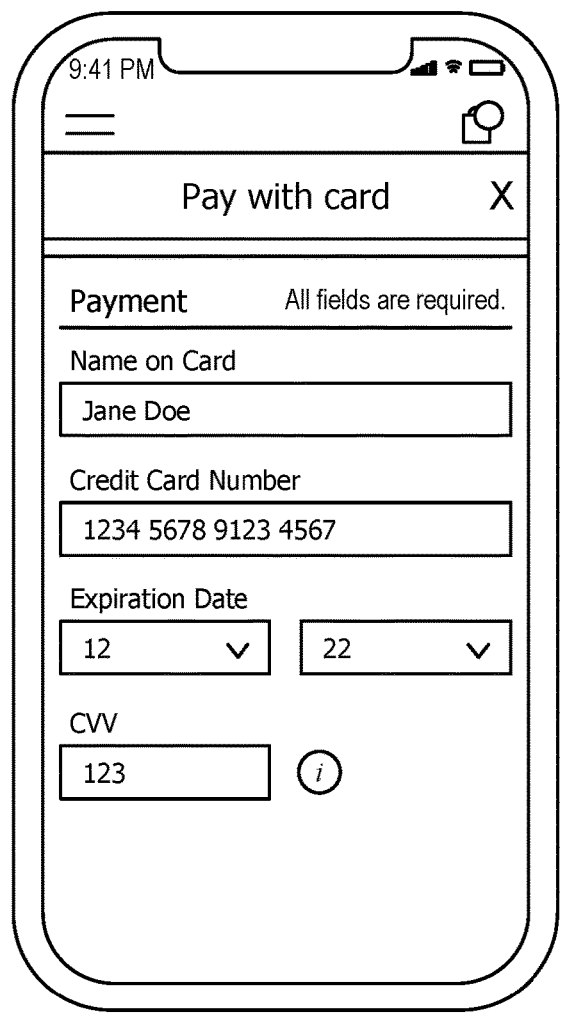

FIG. 4H depicts a screenshot populating credit or debit card information. Once the image is captured as depicted in FIG. 4G, the card information may be populated so that the customer can confirm that the payment information is accurate.

Figure 4I:
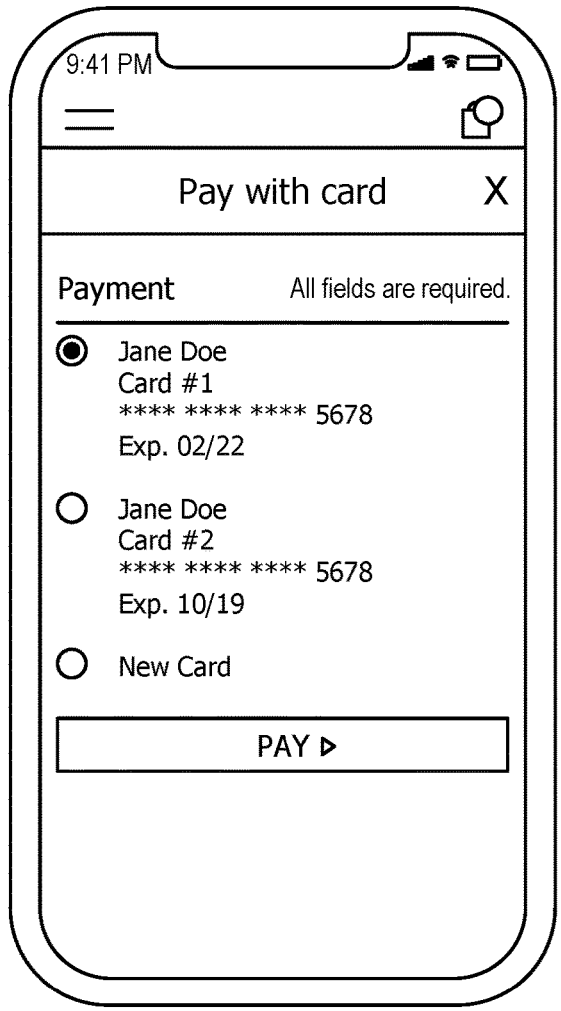

FIG. 4I depicts a screenshot of the payment selection page with account information populated for each payment type in an embodiment of the present disclosure.

Figure 4J:

FIG. 4J depicts a screen shot of a receipt screen that the customer may receive once he/she has completed payment using the application-free web browser-based digital shopping and payment method and system for in-store purchases. As depicted herein, the receipt may include one or more pieces of information including, but not limited, the date of purchase, the payment option, the store where payment was made, the number of items purchased, and/or the total purchase price. The customer may be prompted to present the receipt screen to one of the staff members in the physical retail environment before exiting so that the business can confirm that payment has been made. The receipt screen may include a barcode that the staff members may scan. The receipt screen may also be used by the customer at a later time, for example, if the customer later needs to make a return of one or more items. The receipt screen may feature loyalty points or promotional messaging. The customer may access the receipt at any time after the purchase has been made.

Figure 4K:
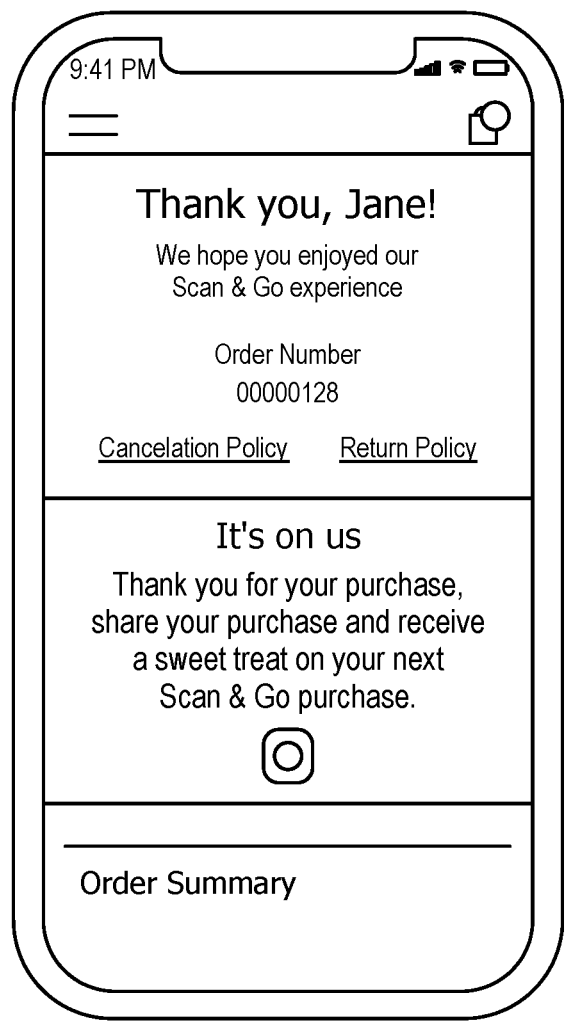

FIG. 4K depicts a "thank you" screen confirming an order number associated with a customer's purchase according to an embodiment of the present disclosure. The "thank you" screen may also depict promotional messaging in embodiments of the present disclosure.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method comprising:
engaging, by a computer platform controlling a mobile device, a web browser running on the mobile device, wherein an ecommerce website is displayed on the web browser during the step of engaging;
instructing, by the computer platform, the web browser to activate a camera module of the mobile device to capture a first image using a camera of the mobile device;
updating, by the computer platform, the ecommerce website that is displayed on the web browser to include a product associated with the first image in an online shopping cart;
marking, by the computer platform, an order comprising the product in the online shopping cart as "IN STORE";
engaging, by the computer platform, the web browser of the mobile device;
instructing, by the computer platform, the web browser to activate the camera module of the mobile device to capture a second image using the camera of the mobile device, the second image containing payment information; and
processing, by the computer platform, payment for the product in the online shopping cart using the payment information obtained from the second image.

2. The method of claim 1, wherein engaging the web browser comprises engaging a script of the web browser.

3. The method of claim 2, wherein the script is a JavaScript.

4. The method of claim 1, wherein the first image comprises a barcode.

5. The method of claim 4, wherein the barcode comprises an international article number (IAN) or a European article number (EAN).

6. The method of claim 1, further comprising:
sending, by the computer platform, a location request to the mobile device;
determining, by the computer platform, a physical location of the mobile device; and
adding, by the computer platform, store information associated with the determined physical location to the ecommerce website that is displayed on the mobile device via the web browser running on the mobile device.

7. The method of claim 1, further comprising:
sending, by the computer platform, the second image, or causing the web browser to send the second image, to an image processing module; and receiving, by the computer platform, the payment information from the image processing module, wherein the payment information is associated with the second image.

8. The method of claim 7, wherein the second image is a payment card.

9. The method of claim 1, further comprising:
receiving, by the computer platform, a payment confirmation for the product; and
creating, by the computer platform, a digital receipt having a third image as proof of purchase of the product.

10. The method of claim 1, further comprising:
sending, by the computer platform, the first image, or causing the web browser to send the first image, to an image processing module; and
receiving, by the computer platform, a product identifier from the image processing module,
wherein the product is associated with the product identifier.

11. A computer platform having a processor, memory, and instructions stored on the memory that when executed, cause the processor to:
engage a web browser running on a mobile device while an ecommerce website administered by the computer platform is displayed on the web browser;
instruct the web browser to activate a camera module of the mobile device to capture a first image using a camera of the mobile device;
update the ecommerce website that is displayed on the web browser to include a product associated with the first image in an online shopping cart;
mark an order comprising the product in the online shopping cart as "IN STORE";
engage the web browser of the mobile device;
instruct the web browser to activate the camera module of the mobile device to capture a second image using the camera of the mobile device, the second image containing payment information; and
process, by a payment module of the computer platform, payment for the product in the online shopping cart using the payment information obtained from the second image.

12. The computer platform of claim 11, further configured to engage a script of the web browser.

13. The computer platform of claim 12, wherein the script is a JavaScript.

14. The computer platform of claim 11, wherein the first image comprises a barcode being an international article number (IAN) or a European article number (EAN).

15. The computer platform of claim 11, wherein the instructions further cause the processor to:
send a location request to the mobile device;
determine a physical location of the mobile device; and
add store information associated with the determined physical location to the ecommerce website that is displayed on the mobile device via the web browser running on the mobile device.

16. The computer platform of claim 11, wherein the instructions further cause the processor to:
send the second image, or cause the web browser to send the second image, to an image processing module; and
receive the payment information from the image processing module, wherein the payment information is associated with the second image.

17. The computer platform of claim 16, wherein the second image is a payment card.

18. The computer platform of claim 16, wherein the image processing module is configured as a plugin on the computer platform.

* * * * *